Dec. 8, 1970  D. G. VINER ET AL  3,545,900

GEAR PUMPS, MORE PARTICULARLY FOR USE WITH HOT FLUIDS

Filed Aug. 12, 1968

INVENTORS
DEREK G. VINER
BY JOHN S. THOMPSON
ATTORNEY 3,545,900
GEAR PUMPS, MORE PARTICULARLY FOR USE WITH HOT FLUIDS
Derek G. Viner and John S. Thompson, Ilford, England, assignors to The Plessey Company Limited, Ilford, England, a British company
Filed Aug. 12, 1968, Ser. No. 752,053
Claims priority, application Great Britain, Sept. 2, 1967, 40,211/67
Int. Cl. F04c 27/00, 15/00
U.S. Cl. 418—131                        6 Claims

ABSTRACT OF THE DISCLOSURE

To provide a low friction gear pump suitable for delivery of hydro-carbon liquids at temperatures between 150 and 250° C. the side faces of the metal housing members or side plates which are in contact with the gears are lined with anti-friction carbon, preferably applied by an epoxy adhesive resistant to the relevant temperatures, and similar coatings may be provided as lining in the journal bearings. The specification also describes a method of making the carbon lined journal bearings by forcing a solid carbon plug into a socket bore of the metal body into the bottom of which a quantity of adhesive has been inserted and which allows clearance round the plug so that the adhesive becomes extruded through the gap to fill the latter completely, and after setting of the adhesive the two end surfaces are re-machined, the carbon plug is bored to convert it into a carbon liner, and the two end surfaces of the body are machined to remove the closed end portion of the socket bore.

---

Figure 1:
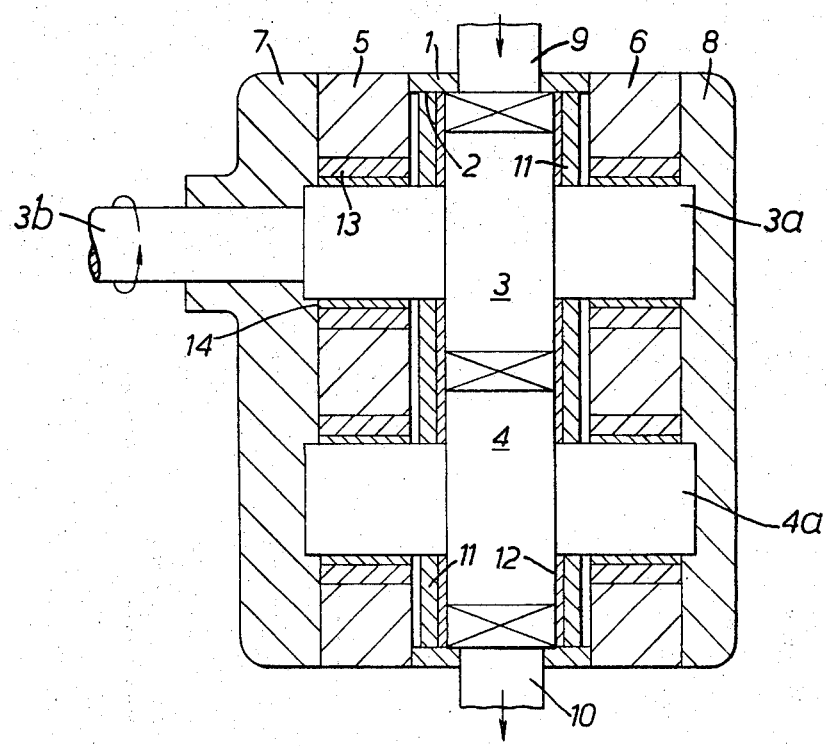

This invention relates to gear pumps and has for an object to provide an improved gear pump which offers special advantages for the delivery of hydro-carbon fuels at temperatures above 150° C.

The necessity of maintaining a seal at each side of the pumping gears between the end surfaces of the gears and a flat side wall causes a substantial proportion of the friction losses in a gear pump to arise in the zones of contact between the ends of the gears and the side walls or movable side plates or bearing plates provided in the pump housing. It has therefore been found desirable to line the side plates with low-friction material, and it has previously been proposed for this reason to make the side walls and side plates of, or line their surfaces which make contact with the pumping gears with, very low-friction bearing materials, for example with copper-based or silver alloys or with silver. It has however been found that when a pump having side-face members made of or lined with such metal is used for delivery of hydro-carbon liquid fuels and other hydro-carbon fluids at temperatures above 150° C., the presence of these metals has a degrading effect on the pumped fluid, resulting in the production of very fine insoluble particles liable to have an undesirable effect in the system in which the pump is operating.

In order to obtain pumps which can withstand corrosive liquids or generally in order to utilise the self-lubricating qualities of carbon materials, it has also been proposed to make the pump housing of a gear pump, or the end plates co-operating with the gear end faces of solid carbon material, and it is a more specific object of the present invention to provide a pump which permits the utilisation of the self lubricating qualities of carbon materials while retaining the benefits of the greater mechanical strength of metal members.

According to the present invention a gear pump comprises a housing assembly having a cavity, a set of pumping gears having gear teeth extending between two side faces of each gear, said gears being supported in the housing assembly for intermeshing rotation in said cavity, said housing assembly including side members having surfaces for sealing co-operation with said side faces of the gears, said side members consisting of metal lined, at least on said sealing surfaces, with carbon material. This carbon material may be a mixture of carbon with finely divided metal of a kind which like carbon has no degrading influence on hydro-carbon fluids at the desired temperature range above 150° C., such as antimony for example, or alternatively the material may be a mixture of carbon and copper, which has been found to be an acceptable composite material although copper or copper alloy alone is unacceptable. The carbon or carbon-and-metal mixture may be secured to a metal base either by heat resistant adhesive such as suitable epoxy resin adhesive or by other heat resistant joining methods, the carbon, or carbon mixture, being bonded to the metal by the adhesive, being held under clamping pressure for the period of cure. The housing and/or side plate itself may in the case of the invention be made of a steel or other material chosen mainly for its mechanical strength. One epoxy base adhesive which has been found highly suitable for the purpose of the invention is the proprietary make known as Eccobond 104 marketed in Great Britain by Emerson & Cummings, which when it is cured at high temperatures chosen between 150 to 250° C. according to the components used, has a high strength at temperatures above 150° C. Preferably a similar carbon lining is also used for the anti-friction surface of the journal bearings of the pump, and in this case the lining is preferably applied as a pre-formed sleeve secured in the bore of the bearing by an epoxy adhesive which during its application is placed under pressure to ensure the absence of any unfilled spaces between the bearing bore and the sleeve.

The invention also includes a method of providing a carbon lined bearing which comprises providing a solid carbon blank having a diameter corresponding to the outside diameter of the desired lining, providing a metal bearing body having a flat-ended socket bore of diameter slightly greater than the outside diameter of said carbon blank, placing a suitable quantity of adhesive on the flat bottom of the bore, placing the carbon blank on top of this quantity of adhesive and applying an end-wise load on to this blank while heating the metal body to the curing temperature of the adhesive to allow the adhesive to form a continuous layer between the blank and the bore walls and the bottom of the bore and to cure the assembly in this condition, allowing the assembly to cool, and machining the composite body to provide the axial bore of the lining and to remove any material projecting beyond the desired end surface of the lined bearing.

The invention on the other hand is not limited to all these particulars, it being possible for example to provide a carbon lined bearing by pressing a mixture of carbon material and suitable bonding material into intimate contact with a bearing surface and heating the assembly to effect curing and/or decomposition of the bonding material, thereby causing the carbon particles to become mechanically keyed with the surface of the metal.

Figure 2:
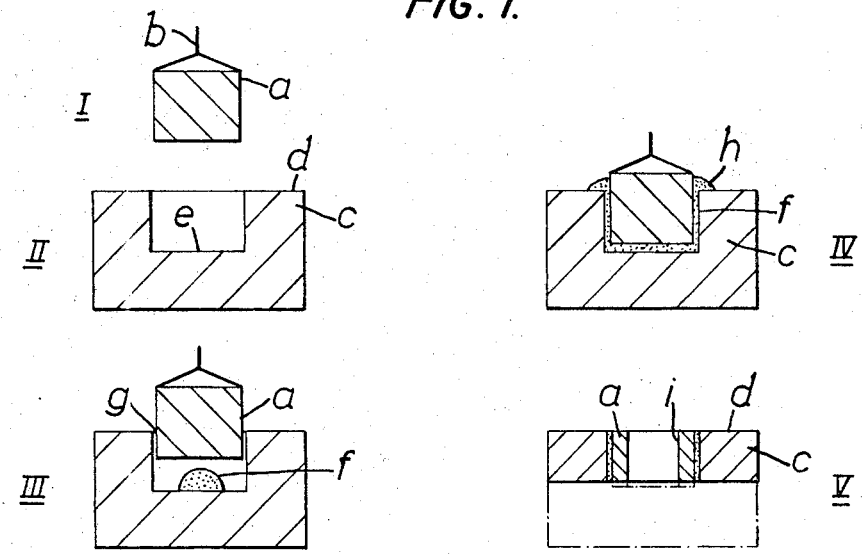

In order that the invention may be more readily understood, one embodiment will now be described in more detail with reference to the accompanying drawings, in which FIG. 1 is a sectional view of a gear pump embodying the invention, and FIG. 2 illustrates successive stages in the manufacture of a carbon lined bearing of the kind suitable for use in the bearing plates of the pump housing according to the invention.

Referring now first to FIG. 1, the gear pump comprises a central housing body 1 having a suitably profiled central opening 2 which accommodates a pair of intermeshing pumping gears 3 and 4, a pair of bearing plates 5 and 6 at each side of the housing body 1 and a pair of housing end plates 7 and 8. Each gear has at both sides journal pins 3a and 4a respectively, one of the journal pins 3a of the gear 3 being extended to form a drive shaft 3b, and the housing body 1 being further provided with inlet and outlet apertures diagrammatically indicated at 9 and 10 respectively. The axial thickness of the housing body 1 is greater than that of the pumping gears 3 and 4 to allow pressure loaded side plates 11 to be accommodated in the cavity 2, one at each side of the gears 3 and 4. In accordance with the main feature of the present invention, each of the side plates 11 is provided at its side facing the gears with a lining 12 of carbon, used alone or in mixture with a suitable metal, the carbon lining being secured to the side plate by an epoxy resin bond. The lining may consist of a variety of carbon materials which include carbon metal mixtures known for bearing purposes, and the bonding is preferably effected in the above described manner with the use of the material known as Eccobond 104. The journals 3a and 4a are supported in the bearing plates 5 and 6 by means of bearing bushes 13 each provided with a carbon lining 14 which is connected with the bush in such manner as to exclude the formation of any cavities and ensure a continuous bond between the carbon lining 14 and the bush 13. Various details of this embodiment may be modified without exceeding the scope of the invention. Thus the bearing bushes 13 may be integral with the bearing plate 5 or 6 and the latter may be integral with the end plates 7 and 8 respectively, and at least one of the side plates 11 may be combined with the bearing plate 5 or 6 to form one integral body. Moreover the invention is not limited to the illustrated construction of the pump in which the bearings are fixed in one of the housing plates and is, for example, also applicable to pumps in which some of the bearings are provided in one or each of the movable side plates.

While the lining of the bearings with carbon material may be effected in any desired manner, one convenient method of producing carbon-lined bearings, for example the bushes 13, 14, will now be described with reference to FIG. 2, in which successive stages of the operation are indicated by Roman figures I to V. In stage I a carbon plug $a$ is produced having an outside diameter equal to the desired outside diameter of the lining, the plug preferably having embedded therein a guide wire indicated at $b$. In the following stage II a steel body $c$ is formed which may be described as a blank for the metal part of the bearing bush 13. It has a length somewhat greater than that of the carbon plug $a$ and has an upper plane surface $b$ from which a flat bottom socket bore $e$ penetrates to a depth somewhat less than the length of the carbon plug $a$ but still at least equal to the desired length of the bush to be formed. In stage III a blob $f$ of suitable adhesive, for example the material known as Eccobond 104 has been placed on the bottom $b$ of the flat bottom of the socket bore $e$, and plug $a$ has been placed in coaxial relation within the bore $e$, leaving a narrow annular gap $g$ around the circumference of the plug $a$. In stage IV the plug, while still being maintained accurately centred relative to the bore $e$, has been forced down towards the body by a load applied to it in an axial direction at a temperature of the body $c$ of 70° C. As a result, the adhesive $f$ has been caused to spread over the bottom of the socket bore $e$ and to rise through the annular gap $g$, completely filling the latter, an excess of adhesive being spilled as indicated at $h$.

The adhesive is then cured at about 200° C., and completion of the curing and subsequent cooling the assembly is machined, first removing the portion of the plug and spilled adhesive above the surface $e$ and refinishing the surface $e$ to an accurate plane condition, whereafter a central bore $i$ is formed in the carbon plug $a$ to convert the latter into a liner inside the bore $e$, and finally the bottom portion of the blank $c$ is removed in order to reduce the latter to the desired length of the bush. This operation removes the unbored portion of the blank as well as the portion containing the bottom of the bore $e$ with the layer of adhesive spread along the bottom, and leaves a completed carbon lined bush in which the bore $e$ forms a through bore.

It will be appreciated that axial compression of the plug $a$ will produce a certain degree of radial expansion in accordance with the precise plug material utilised. Since curing of the adhesive is effected with a compressive load applied, bearings may be produced of prestressed carbon material which provide in use good load bearing properties.

What we claim is:

1. A gear pump comprising a housing assembly having a cavity, a set of pumping gears having gear teeth extending between two side faces of each gear, said gears being supported in the housing assembly for intermeshing rotation in said cavity, said housing assembly including side members having surfaces for sealing co-operation with said side faces of the gears, and said side members each comprising a body of metal provided at least on such sealing surfaces, with a lining of carbon material bonded to said metal body by a non-fusion bond.

2. A gear pump as claimed in claim 1 wherein the carbon material comprises carbon and finely divided metal so chosen that the composite carbon material has no unacceptable degrading effect on hydrocarbon fluids at temperatures of the order of 200° C.

3. A gear pump as claimed in claim 1 wherein the pump gears are journalled in bearing surfaces of carbon material.

4. A gear pump as claimed in claim 1, which includes a plate mounted within the housing cavity and constituting such side member.

5. A gear pump as claimed in claim 1, wherein said lining is bonded to the metal of said body by a layer of adhesive resistant to heat up to a temperature above 150° C.

6. A gear pump as claimed in claim 1, wherein said lining is bonded to the metal of said body by a layer of an epoxy adhesive.

References Cited

UNITED STATES PATENTS

| 2,611,323 | 9/1952 | Digney | 103—126(L) |
| 2,619,039 | 11/1952 | Maisch | 103—126(M) |
| 2,619,040 | 11/1952 | Maisch | 103—126(M) |
| 3,171,359 | 3/1965 | Spencer et al. | 103—126(L) |

MARK NEWMAN, Primary Examiner

W. J. GOODLIN, Assistant Examiner

U.S. Cl. X.R.

418—178, 179